Figure 1:
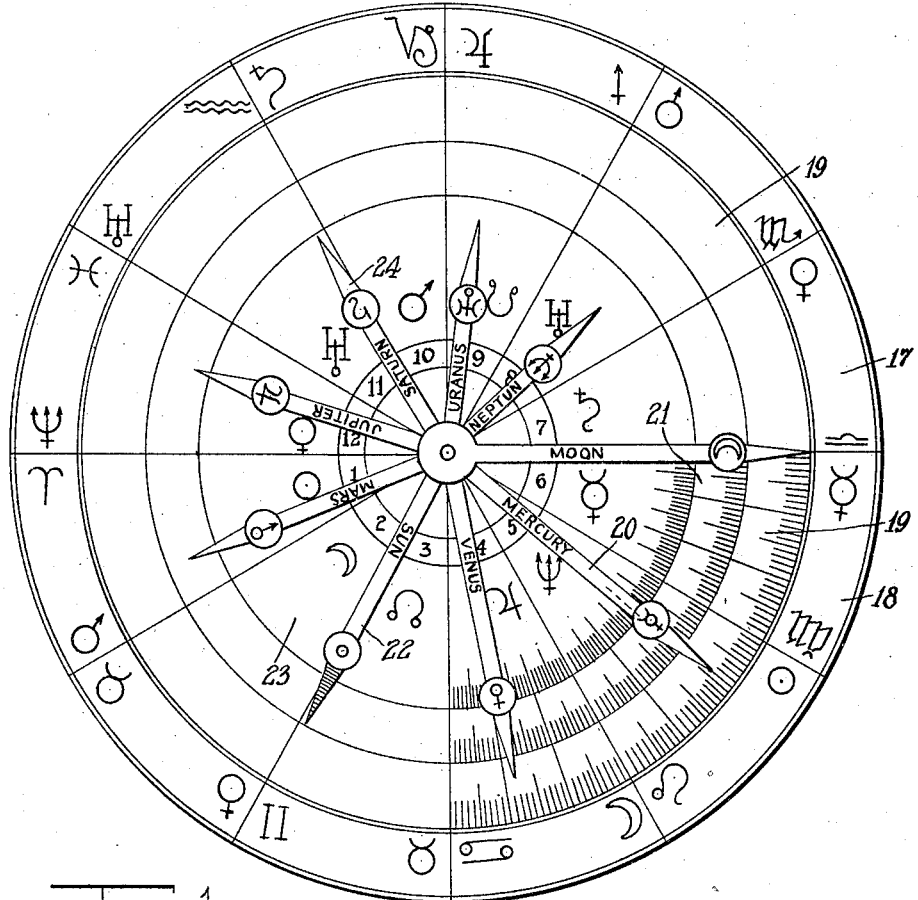

Aug. 3, 1926.

H. D. KUHLMAN 1,594,675

MECHANICAL HOROSCOPE CHART

Filed March 19, 1926

INVENTOR
H.D. Kuhlman

BY
ATTORNEY

Patented Aug. 3, 1926.

1,594,675

UNITED STATES PATENT OFFICE.

HENRY D. KUHLMAN, OF GARDEN CITY, KANSAS.

MECHANICAL HOROSCOPE CHART.

Application filed March 19, 1926. Serial No. 95,855.

The main object of this invention is to provide a chart divided into segments each one of which signifies one of the twelve signs of the zodiac, that is, a segment is provided for the signs Aries, Taurus, Gemini, Cancer, Leo, Virgo, Libra, Scorpio, Sagittarius, Capricorn, Aquarius, and Pisces. The chart illustrated uses the geocentric system of horoscope reading, where the earth is taken as a center of the universe. This chart may be readily used to interpret horological readings when used with an almanac. The chart is provided with hands which can be moved to the sign and degree of the planets, or the position of the sun and moon on a given date, and the aspects of the planets sun and moon to each other can be easily and clearly calculated therefrom by one skilled in the art.

The above and other objects will become apparent in the description below, in which characters of reference refer to like-named parts in the drawing.

Referring briefly to the drawing, Figure 1 is a top plan view of the chart.

Figure 2:
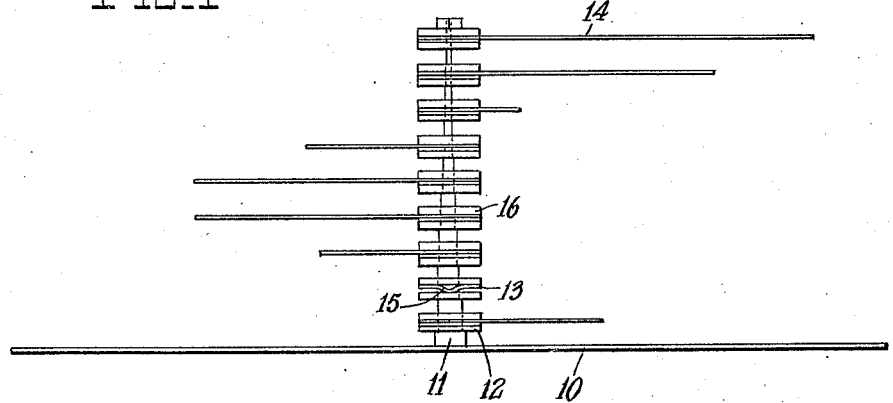

Figure 2 is a side elevational view of the same.

Referring in detail to the drawing, the numeral 10 indicates a circular disk which may be composed of any desirable material. This disk has an axial stud 11 extending vertically upward which has successively reduced diameters thereon to provide shoulders. On each shoulder, a support washer 12 is seated. Mounted on each of the support washers, is the circular end 13 of an indicator arm 14. These arms are nine in number and are of successively reduced lengths, the uppermost arm being the longest while the lowermost is the shortest. The circular ends 13 of the indicator arms are crimped diametrically as indicated by the numeral 15 so as to form a frictional pinch fit in a space between each of the support washers 12 and a cover washer 16 which lies above each of the support washers, a space existing between each pair of washers.

The face of the chart is divided into twelve segments 17, which are again divided by lines into six areas which extend from the axis of the chart outwardly side by side. The outer area 18 of each segment has a sign of the zodiac at one corner and at the opposite corner, the sign of the planet ruled by that particular zodiac sign. The area 19 adjacent to the area 18 is divided by graduations into thirty degrees. The signs of the zodiac and the planets in the areas 18 are indicated by the uppermost and longest arm 14 mounted upon the stud 11. The graduations in the area 19 are indicated by the next shorter arm 20. The area 21 adjacent the area 19 is also provided with thirty graduations in each segment and these graduations are indicated by the arm 22. In the next area 23, identical graduations are formed and are indicated by the arm 24. In a ring which forms the next area adjacent to the area 23, numerals are provided which indicate the particular sign of the zodiac in that particular segment. Each of the indicator arms is inscribed with lettering indicating a particular planet.

Each sign of the zodiac is ruled by a certain planet, that is, Mars rules Aries, Venus rules Taurus, Mercury rules Gemini, the Moon rules Cancer, the Sun rules Leo, Mercury rules Virgo, Venus rules Libra, Mars rules Scorpio, Jupiter rules Sagittarius, Saturn rules Capricorn, Uranus rules Aquarius, and Neptune rules Pisces. The symbols of the ruling planets are placed in the outer rim or area in their respective signs. The other symbols of the planets marked in each section indicate that the planet is dignified in that sign. The hands are marked with the symbols of the planets and are of varied length. The longest hand presents the Moon, which travels the swiftest in its orbit, and the shortest hand presents Neptune which is slowest in its travel thru its orbit.

The use of this chart is well known to those skilled in the art, and a description of its use is therefore not deemed necessary.

It is to be noted that changes may be made to the construction which remain within the spirit and scope of the invention.

I claim:—

1. A horological chart comprising an annular disk, said disk being divided into twelve segments, each segment indicating one sign of the zodiac with its particular ruling planet, a stud extending vertically upward from said chart, said stud being mounted axially on said chart, an arm for each segment mounted on said stud one above the other, the upper arm being the longest, the lower arm being the shortest, the length of said arms being governed by the speed of travel thru the orbits of the particular planets which the particular arm represents, and gradually increasing surfaces on said stud for retaining the arms rotatable in vertically spaced apart relation one above the other.

2. A horological chart comprising an annular disk, said disk being divided into twelve segments, each segment indicating one sign of the zodiac with its particular ruling planet, a stud extending vertically upward from said chart, said stud being mounted axially on said chart, an arm for each segment mounted on said stud one above the other, the upper arm being the longest, the lower arm being the shortest, the length of said arms being governed by the speed of travel thru the orbits of the particular planets which the particular arms represent, said stud having successively reduced diameters thereon, the smallest diameter being at the top, the largest at the bottom, the successive reductions of said diameters forming shoulders, support washers mounted on said shoulders, the indicator arms being mounted on said washers, and means for frictionally retaining said indicator arms in place.

3. A horological chart comprising an annular disk, said disk being divided into twelve segments, each segment indicating one sign of the zodiac with its particular ruling planet, a stud extending vertically upward from said chart, said stud being mounted axially on said chart, an arm for each segment mounted on said stud one above the other, the upper arm being the longest, the lower arm being the shortest, the length of said arms being governed by the speed of travel thru the orbits of the particular planets which the particular arms represent, said stud having successively reduced diameters thereon, the smallest diameter being at the top, the largest at the bottom, the successive reductions of said diameters forming shoulders, support washers mounted on said shoulders, the indicator arms being mounted on said washers, an additional washer spaced above the support washer, one end of said arms being crimped to fill the space between the support washer and the additional washer to frictionally retain the indicator arms in any desired position.

In testimony whereof I affix my signature.

HENRY D. KUHLMAN.